(12) United States Patent
Greif et al.

(10) Patent No.: US 10,104,898 B2
(45) Date of Patent: Oct. 23, 2018

(54) APPARATUS AND METHOD FOR TRANSFERRING AND PLACING COLLATED SAUSAGE LINKS INTO A PACKAGING ITEM

(71) Applicant: VEMAG Maschinenbau GmbH, Verden/Aller (DE)

(72) Inventors: Norman Greif, Bremen (DE); Gerd Scharninghausen, Kirchlinteln (DE); Oliver Brecht, Eystrup (DE); Thorsten Meininger, Verden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 15/878,884

(22) Filed: Jan. 24, 2018

(65) Prior Publication Data

US 2018/0206510 A1 Jul. 26, 2018

(30) Foreign Application Priority Data

Jan. 25, 2017 (DE) .................. 10 2017 101 464

(51) Int. Cl.
| | |
|---|---|
| *A22C 15/00* | (2006.01) |
| *B65B 5/06* | (2006.01) |
| *B65B 25/06* | (2006.01) |
| *B65B 35/24* | (2006.01) |

(52) U.S. Cl.
CPC ............ *A22C 15/002* (2013.01); *B65B 5/06* (2013.01); *B65B 25/065* (2013.01); *B65B 35/24* (2013.01)

(58) Field of Classification Search
CPC ....... A22C 15/00; A22C 15/001; A22C 11/00; A22C 11/008

USPC ....... 452/30-32, 35-37, 46-49, 51; 198/347.2, 382, 395; 99/486; 53/500, 53/501, 152, 153, 148, 251, 448, 444, 53/247, 531, 473

See application file for complete search history.

(56) References Cited

U.S. PATENT DOCUMENTS

| | | | | |
|---|---|---|---|---|
| 4,018,324 A | * | 4/1977 | Kamphues | B65G 47/086 198/347.2 |
| 4,193,329 A | * | 3/1980 | Strunc | B26D 7/08 83/111 |
| 4,344,523 A | * | 8/1982 | May | B65G 47/841 198/418.3 |

(Continued)

FOREIGN PATENT DOCUMENTS

| | | |
|---|---|---|
| DE | 4334238 A1 | 4/1995 |
| DE | 19610965 A1 | 9/1997 |

(Continued)

*Primary Examiner* — Richard T Price, Jr.
(74) *Attorney, Agent, or Firm* — Wood Herron & Evans LLP (57) ABSTRACT

An apparatus is provided for transferring at least one sausage link into a packaging item. The apparatus includes at least one drivable, rotatable conveyor device having at least one protruding vane, with the conveyor device being adapted and configured in such a way that the at least one sausage link can be placed on the vane in a receiving position, and that by rotating the conveyor device, the at least one sausage link can be placed onto or into the packaging item by the vane in a delivery position. The conveyor device may further include an impeller that forms, in part, a horizontal support surface for a group of sausage links.

20 Claims, 6 Drawing Sheets

(56) References Cited

U.S. PATENT DOCUMENTS

| | | | | |
|---|---|---|---|---|
| 4,633,652 A * | 1/1987 | Dagenais | ............... | B65B 19/34 |
| | | | | 53/148 |
| 4,733,518 A * | 3/1988 | Griesdorn | ............... | B65B 19/34 |
| | | | | 53/148 |
| 4,790,116 A * | 12/1988 | Stridh | ............... | B65B 5/06 |
| | | | | 53/244 |
| 5,057,055 A * | 10/1991 | Michaud | ............... | A22C 11/008 |
| | | | | 452/182 |
| 5,060,454 A * | 10/1991 | Benz | ............... | B65B 5/106 |
| | | | | 198/347.3 |
| 5,388,385 A * | 2/1995 | Phelps | ............... | B65B 19/34 |
| | | | | 414/746.8 |
| 5,704,195 A * | 1/1998 | Benz | ............... | B65B 5/08 |
| | | | | 53/148 |
| 6,374,984 B1 * | 4/2002 | Nagler | ............... | B07C 5/361 |
| | | | | 177/1 |
| 6,779,647 B1 * | 8/2004 | Nagler | ............... | A22C 17/0093 |
| | | | | 198/395 |
| 7,381,123 B2 * | 6/2008 | Bachtle | ............... | A22C 11/107 |
| | | | | 452/46 |
| 2011/0124276 A1 | 5/2011 | Waldrop et al. | | |

FOREIGN PATENT DOCUMENTS

| | | |
|---|---|---|
| DE | 10124712 A1 | 11/2002 |
| EP | 3053443 A1 | 8/2016 |

* cited by examiner

APPARATUS AND METHOD FOR TRANSFERRING AND PLACING COLLATED SAUSAGE LINKS INTO A PACKAGING ITEM

CROSS REFERENCE TO RELATED APPLICATION

The present application claims priority to German Patent Application No. 10 2017 101 464.0 filed Jan. 25, 2017, the disclosure of which is hereby incorporated herein by reference in its entirety.

TECHNICAL FIELD

The present invention relates to food handling, and, more particularly, to an apparatus for transferring at least one sausage link into a packaging item.

BACKGROUND

Examples of such apparatus are known from the prior art. For example, U.S. patent application no. 2011/0124276 A1 discloses a device for forming groups of sausage links and for depositing them into packaging trays. To achieve that purpose, the device has a conveyor belt for forming groups of sausage links and a second conveyor belt which transports the groups of sausage links from a surface into packaging trays arranged underneath said surface.

The disadvantage of the prior art described above is that the speed with which the groups of sausage links are deposited into the packaging trays is limited. If the second belt unit moves too quickly, it is no longer possible to place the groups of sausage links into the packaging trays without errors occurring. Nor is it possible to ensure that the groups of sausage links are correctly aligned.

DE 101 24 712 A1 also shows a device for placing sausages into a packaging item, in which a shaft which can be moved along the packaging item and be stopped at a desired position is arranged over the packaging item.

DE 196 10 965 A1 discloses a device for further transport of sausages which have been fed to the device by a conveyor belt. A mechanism for removing the sausages from the conveyor and which is provided in the form of a star wheel is assigned to the conveyor belt.

In addition to the above, DE 43 34 238 A1 shows an apparatus for packing sausages, and/or sausage meat shaped into sausages, which are transported via a feeder unit into a packaging station in which at least one star wheel is arranged above a packaging item and is assigned to the feeder unit.

A sausage collating device and a method for collating sausages to form groups comprising a predetermined number of sausages, with a transport device for transporting the spaced-apart sausages and at least one accumulator element for accumulating the sausages is known from EP 3 053 443 A1, in which the at least one accumulator element for collating the sausages can be moved in the direction of transport of the transport device.

The apparatuses described above are also unable to release groups of sausages into packaging units at high speed with reliable guidance and in an error-free manner.

Given this background, the object of the invention is to develop an apparatus of the kind initially specified in such a way that the disadvantages of the prior art are eliminated as far as possible. More specifically, the object of the present invention is to provide an apparatus and a corresponding method for transferring sausage links or food portions, such as groups of sausage links, with precision and at high speed and with low susceptibility to error, thereby for transferring them into a packaging item.

SUMMARY

According to the invention, the object is achieved in an apparatus of the kind initially specified by at least one drivable, rotatable conveyor device having at least one protruding vane, said conveyor device being adapted and configured in such a way that the at least one sausage link can be placed on the vane in a receiving position and that by rotating said conveyor the at least one sausage link can be placed onto or into the packaging item by the vane in a delivery position, each of the two conveyor devices being provided in the form an impeller having at least two, preferably four vanes spaced substantially equally apart, and the impellers being designed and dimensioned so that two opposite vanes of the impellers, in the receiving position, form a substantially horizontal support surface for a group of sausage links.

Several advantages are produced according to the invention. Firstly, such an apparatus allows food portions, in particular groups of sausage links, to be transferred into the packaging at high speed by moving the conveyor device in the direction of product flow. The apparatus is also less complex as far as the number of components required is concerned, as well as being low-maintenance, cost-efficient and highly reliable. Furthermore, the apparatus allows the food portions to be transferred to the packaging with precision and in a manner that is gentle to the product. The risk of mechanical damage being caused to the sausage body by the transfer process is reduced.

Other advantages which result are that, when the impeller is designed accordingly, one vane on each conveyor device can be used as a support surface for the at least one sausage link, and another vane as a lateral boundary and thus for laterally guiding the sausage link. This makes it possible to guide the plurality of sausage links and transfer them into the packaging. This provides advantages in respect of speed, because two spaced-apart vanes allow the ends of a group of sausage links to be guided during rotation of the impellers, such as by being pushed toward the packaging or into the packaging, against the effect of mass inertia. In this way, the group of sausage links can be accelerated by the impellers and pressed into the packaging, if need be. This precision with which the links are deposited can also be increased. Thus, the process of depositing the sausage links is carried out with greater reliability overall. All in all, this integration of the functions of providing a support surface and providing lateral guidance also helps to reduce the number of components that are needed. In this way, it is possible to reduce the costs for production, maintenance costs and spare parts for the apparatus itself, compared to the prior art. It is also advantageous that the impellers themselves are used as a support surface, thus obviating the need for any further support surfaces on the part of the apparatus itself.

It is further preferred that two co-operating conveyor devices each having at least one protruding vane are provided and are arranged spaced apart in relation to each other in such a way that the at least one sausage link can be placed simultaneously on two vanes of the spaced-apart conveyor devices, and that by synchronous rotation of the conveyor devices in opposite directions the at least one sausage link can be placed onto or into the packaging item by the vanes.

A further advantage with regard to the speed of transfer and placement in the packaging can be achieved by such an arrangement with two co-operating conveyor devices. Furthermore, the at least one sausage link is guided at all times parallel to the plane of the packaging base, thus providing the advantage that the sausage links can be released into the packaging at high speed. Mechanical effects on the sausage links are also reduced. It is thus possible for the sausage links to be placed into the packaging gently and quickly, all in all.

It is further preferred that each impeller has four vanes which substantially form the shape of a cross.

The cross shape provides the advantage that one vane of each impeller serves as a support surface, and another vane as a lateral boundary. Such an arrangement of the vanes also allows the at least one sausage link to be guided laterally with precision during the depositing process which is performed by rotating the impellers. During rotation of the impellers, the plurality of sausage links is also in a position which is bounded not only laterally, but also from above and from below. This makes it possible for sausage links to be deposited more quickly than would otherwise be possible if the force of gravity is used. By means of the impellers, it is possible at this point to accelerate the sausage links in the direction of the packaging. Achieving this high speed of depositing is also supported in a positive manner by the fact that there is no need to change the direction of rotation of the impellers, and that no reverse movements of the impellers are necessary to transfer the next group of sausage links after one group of sausage links has been deposited.

It is further preferred that two spaced-apart impellers of the two conveyor devices, each having a plurality of vanes, preferably four, are designed and can be rotated in opposite directions such that a group of parallel and adjacently arranged sausage links can be placed on two adjacent vanes of the spaced-apart impellers, and during rotation of the impellers in opposite directions a group of sausage links is laterally guided at two opposite ends of the sausage links by adjacent vanes of an impeller on their path of movement toward the packaging item, and on further rotation of the impellers the group of sausage links is released from the vanes of the adjacent impellers and can be placed into the packaging item.

This produces the advantages concerning the high speed at which the sausage links are placed in the packaging, and the exactitude with which they are guided, and thus results in the sausage links being placed in the packaging at a high level of quality, which in turn allows a higher transfer rate than in the known prior art.

According to one preferred embodiment, the surface of the vanes is substantially planar. This provides the advantage that sausage links and groups of sausage links can be fed to the apparatus with little friction. In that respect, the amount of energy required to feed the sausage links is low compared to alternative surface shapes and configurations, and it is also possible, as far as the quality of their outer skins is concerned, to transport the sausage links and to place them finally in a packaging item in a particularly gentle manner.

According to one preferred development of the invention, the surface of the vanes is at least partially concavely and/or convexly curved, such that during motion between the vanes, the sausage link or the group of sausage links is guided in a controlled manner and/or is additionally accelerated or delayed.

By shaping the surface of the vanes in this way, at least one sausage link can be placed into the packaging item with greater speed. When the surface of the vane is designed as described above, it serves as a pusher dog which enables the sausage link or the group of sausage links to be accelerated and moved in the direction of the packaging item with an acceleration greater than gravitational acceleration. By providing specific curved shapes, it is also possible to adapt the vane to the shape of the products, so that the vane has the size and the shape of the sausage links, which can improve how they are guided and transferred.

According to another preferred embodiment, the two impellers have rotational axes which are arranged parallel to each other and which are spaced apart from each other in such a way that the distance between the rotational axes is greater than the length of the group of sausage links.

Spacing the rotational axes apart in such a way allows sausage links or groups of sausage links to have sufficient room for maneuver at all times, without adversely affecting the sausage links or their surface, while simultaneously guiding the sausage links or groups of sausage links in such a way that it is possible to place them into a packaging item with great precision.

According to a preferred development of the invention, the apparatus has an adjusting device by which the distance of the impellers from each other can be varied, in a range which corresponds substantially to the width of the group of sausage links to be placed.

Such a device allows the apparatus to be adjusted within a very short time to different lengths of sausage links. All in all, a high level of flexibility is achieved as a result. Set-up procedures can be carried out within a very short time. Batch changeover costs can thus be reduced.

It is also preferable that the apparatus has a feeder unit comprising a circulating convey-or element for feeding groups of sausage links in a feeding direction to the conveyor device or to the conveyor devices.

It is possible by such a unit to feed sausage links or groups of sausage links in a particularly gentle manner. The circulating conveyor element can also be operated in such a way that sausage links are collated accordingly. This makes it possible to feed and, if necessary, to collate the product in a flexible manner.

It is further preferred that the apparatus has a stop member which limits the feed path of the groups of sausage links in the feeding direction and which guides the group of sausage links in the feeding direction until it is placed into the packing item.

This provides the advantage that the sausage link or group of sausage links can not only be introduced into the apparatus in a guided manner, but that this guidance is also maintained during the packaging process, such that the sausage link or group of sausage links can be placed into the packaging with great precision. This indirectly provides the advantage that the susceptibility of such an apparatus to failure is reduced in comparison with the prior art.

It is further preferred that the stop member can be adjusted in the feeding direction against the feeding direction of the groups of sausage links.

This provides the advantage that the apparatus can be adjusted for different diameters (calibers) of sausages just as quickly as for a different number of sausage links per group of sausages. All this helps the apparatus to be particularly versatile in its deployment, overall, and set-up times, as well as set-up costs, to be reduced.

Another preferred embodiment is characterized in that the stop member has a drive unit for moving the stop member.

The advantages, namely that the apparatus can be quickly adjusted for groups of sausages of different caliber and quantity, can be achieved particularly quickly as a result. It is also possible to adjust the apparatus without an operator having to perform the adjustments directly on the apparatus. The entire adjustment process can also be automated.

It is further preferred that at least one impeller consists at least partially of plastic, specifically food-safe plastic. This provides the advantage that the impeller can not only be produced cost-efficiently, but is also easy to clean and inexpensive to replace.

According to a preferred embodiment, the apparatus also has a coupling element having a receptacle for an impeller and configured to provide a detachable connection to the impeller. This provides the advantage of reducing set-up times, ensuring that the impeller can be rapidly replaced not only in the case of maintenance or wear and tear, but also if the apparatus must be adjusted for an alternative production batch. It is conceivable in this regard, for example, that the sausage links have different bending stiffness requiring different vane widths and/or depths, depending on the batch. Being able to replace the impellers is particularly advantageous in that this enables the apparatus to respond to different production conditions.

It is also particularly preferred that the apparatus has an electrical drive unit for driving the rotatable conveyor device, in particular the impellers, wherein the drive unit preferably has a linear motor or stepper motor for driving the at least one impeller.

This provides the advantage that the one or more impellers can be controlled exactly with regard to their motion profile. It is possible, for example, to configure the acceleration behavior of the one or more conveyor devices with precision for a maximum depositing speed and simultaneously so that the material is treated gently to the maximum possible extent. Different motion profiles can also be stored for different production batches, for example, to optimize how the different products are placed into the packaging.

It is also particularly preferred that the drive unit has a controller for controlling the stop positions, movements and accelerations of the at least one impeller.

In combination with the advantages, this again allows the depositing process to be optimized. Many parameters for different products, product sizes, quantity of sausages collated in a group and product caliber can be stored by the controller.

In a second aspect, the object of the invention is achieved by a method for transferring groups of sausage links into a packaging item, said method comprising the steps of: loading a group of sausage links into a transfer device having at least one impeller; rotating the at least one impeller, in particular by an angle of 90°, about its rotational axis; releasing the group of sausage links into the packaging item; placing a group of sausage links arranged parallel and adjacent to each other on two adjacent vanes of two spaced-apart impellers, while on each side of the group of sausage links a vane of the impellers guides the sausage links laterally; rotating the impellers in opposite directions, while the ends of the sausage links are laterally guided by vanes of adjacent impellers on the path of movement toward the packaging item and placing the group of sausage links into the packaging item.

Such a method allows the group of sausage links to be placed into a packaging item with speed and precision. The method allows the sausage links or groups of sausage links to be placed into a packaging item with low susceptibility to failure and simultaneously with a high level of precision.

It is further preferred that the method comprises the additional step of collating sausage links into groups, such as with the aid of a triangular belt.

This provides the advantage that the sausage links can not only be fed by such a belt, but also that groups of sausage links of whatever kind can be produced.

According to a preferred development of the invention, the apparatus for placing groups of sausage links into packaging is an apparatus of the kind described in the foregoing. The advantages mentioned and discussed above are provided analogously as a result.

In a third aspect, the object of the invention is achieved by a system for collating and loading sausage links into packaging items, said system comprising at least: a feeder unit for feeding single sausage links transversely to the direction of transport onto a feeder belt unit, wherein the distance between the sausage links on the feeder belt unit is definable; a feeder belt unit for guiding the sausage links from the feeder unit to a means for placing groups of sausage links into a packaging item; a triangular belt for collating sausage links and forming groups of sausage links and an apparatus for placing groups of sausage links into a packaging item.

The advantage of such a system is that individual sausage links can be collated into groups and transferred to a packaging item at high speed. With regard to further advantages, reference is made to the statements made in the foregoing.

BRIEF DESCRIPTION OF THE DRAWINGS

Further features and advantages of the invention will be evident from the following description, in which embodiments are described in more detail with reference to schematic drawings, in which.

DETAILED DESCRIPTION

Figure 1:
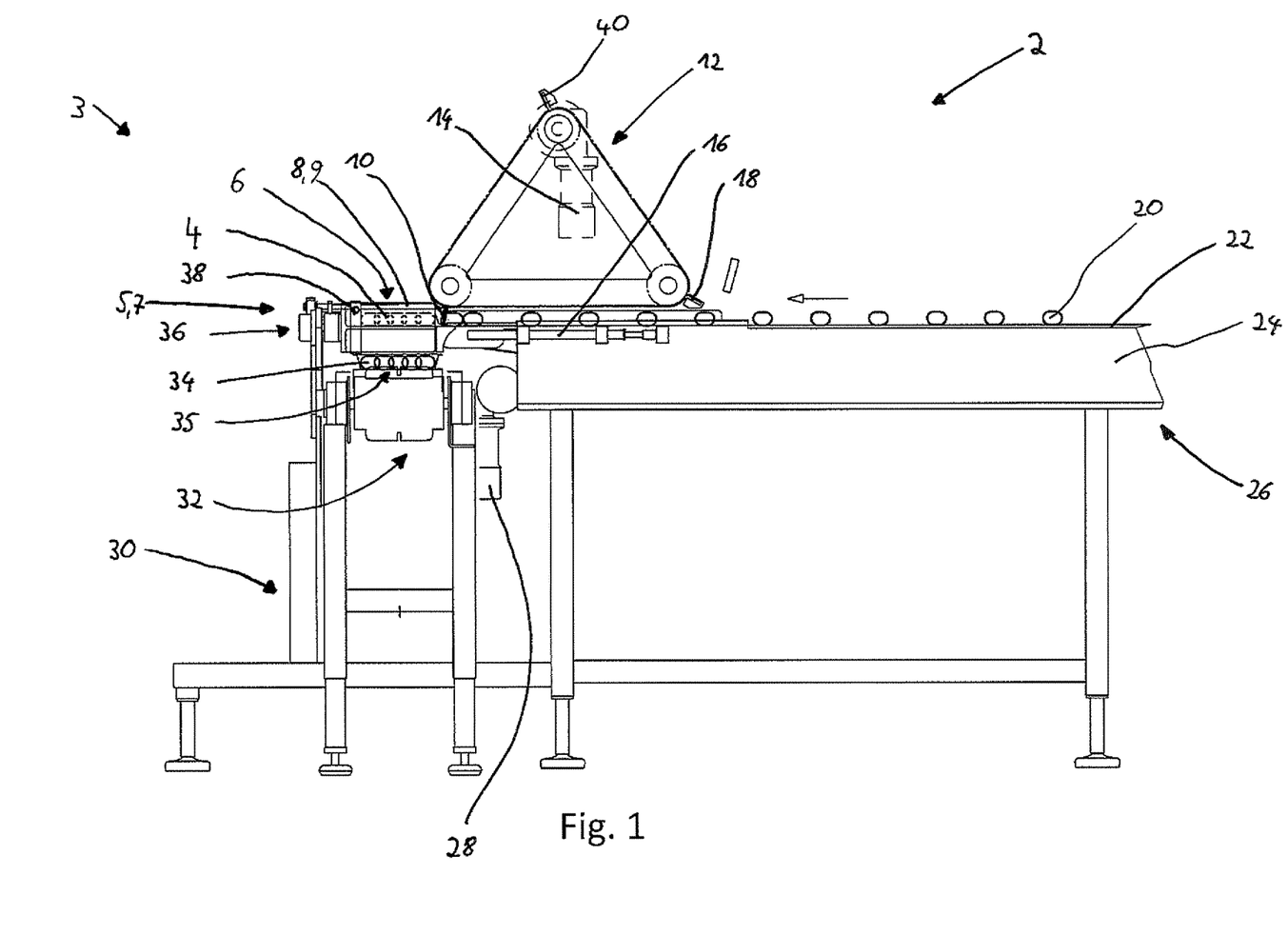
FIG. 1 shows a side view of one embodiment of the transfer apparatus according to the invention.

FIGS. 1 through 5F show a first embodiment of an apparatus and method in accordance with the invention. To this end, FIG. 1 shows a collating and transfer apparatus 2 substantially comprising a feeder belt unit 26, a triangular belt 12, a transfer apparatus 6 according to the invention, and a packaging transfer apparatus 32. Feeder belt unit 26, triangular belt 12, transfer apparatus 6 and packaging transfer apparatus 32 are arranged on a basic frame 30. Basic frame 30 may consist of various separate frames, in a manner which is known.

By means of feeder belt unit 26, sausage links 20 are supplied which are spaced substantially equally apart 20 and which are oriented transversely to the direction of movement of feeder belt 22. Feeder belt unit 26 also has a cover 24 and a tensioning device 16. Feeder belt unit 26 also has a drive unit, which is not shown here.

A triangular belt 12 is arranged above a section of the feeder belt unit. There are pusher dogs 40, 18, 10 on triangular belt 12. Furthermore, triangular belt 12 is driven by drive unit 14. Drive unit 14 allows triangular belt 12 and pusher dogs 40, 18, 10 connected thereto to be operated with different speed profiles, including intermittently and continuously.

Figure 2:
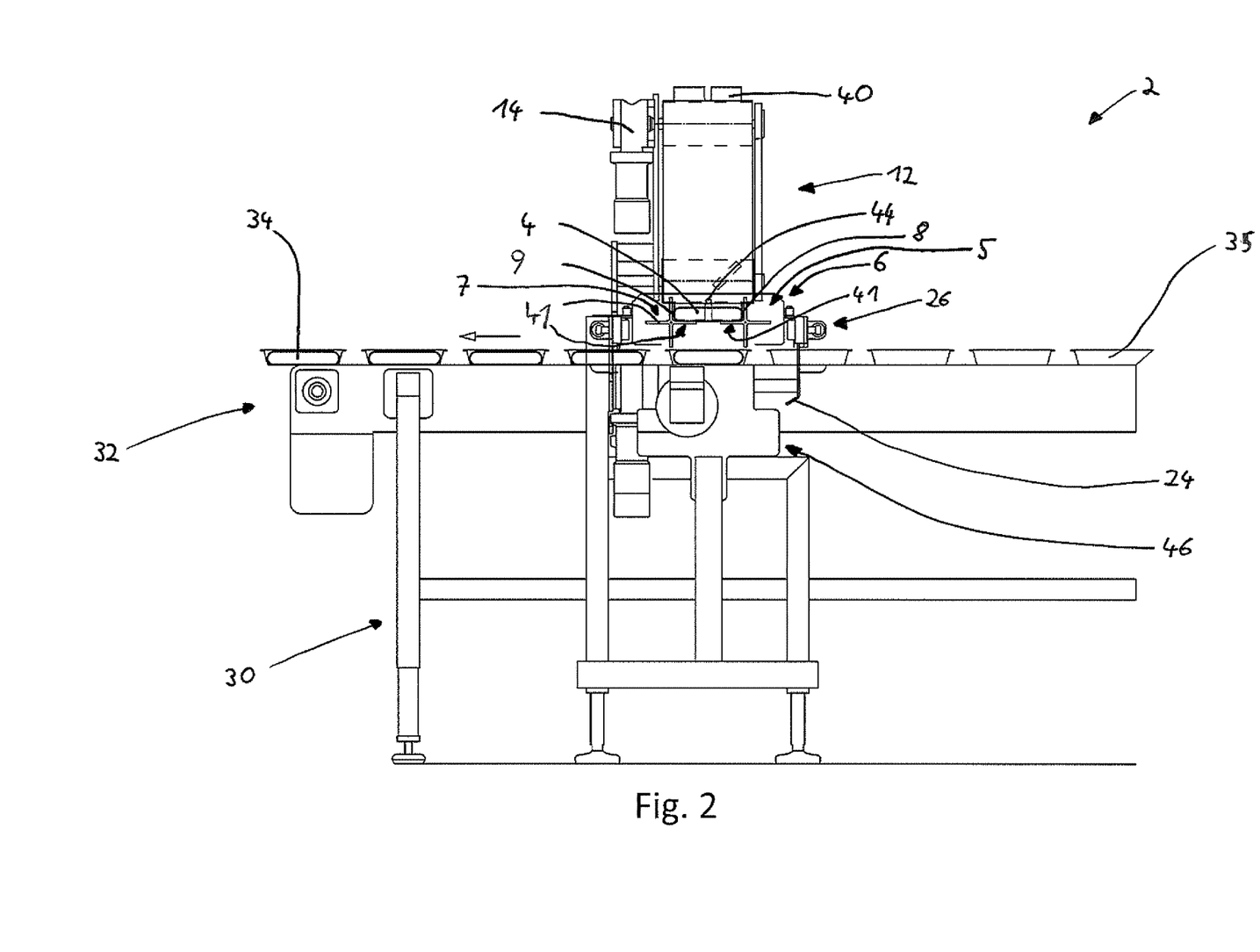
FIG. 2 shows a front view of the transfer apparatus of FIG. 1, with the front view being parallel to the direction in which the packaging items move.

In the case shown here, triangular belt 12 is used to form groups of sausage links 4. For that purpose, triangular belt 12 is operated intermittently and at a speed which is greater than the transport speed of feeder belt unit 26. In this way, the spaced-apart sausage links 20 are collated with the aid of pusher dogs 40, 18, 10 into groups of the desired size. The group of sausage links 4, for example, contains five sausage links. In addition to collating sausage links into groups, triangular belt 12 is also responsible for feeding groups of sausage links 4 to transfer apparatus 6. Transfer apparatus 6 is used to transfer a single sausage link 20, and preferably a group of sausage links 4, to a packaging item 35 and has a first impeller 8 and a further impeller 9 which is visible in FIGS. 2 and 3, for example. Reference is made to FIG. 2, with specific regard to the second impeller 9. Transfer apparatus 6 also has an adjustable stop member 38. Each impeller 8, 9 also has a drive unit 36.

In combination with a controller (not shown), drive unit 36 allows impeller 8 to move in conjunction with a second impeller 9, which cannot be seen in FIG. 1 due to the chosen perspective. This movement may comprise different angles of rotation, different rates of acceleration and different stop positions. The group of sausage links 4 that has been supplied now rests on a vane 41 of the first impeller 8 and of a further impeller 9. By rotation of impeller 8, which is coordinated with the rotation of the second impeller 9, the group of sausage links 4 is guided relative to a packaging item 35, then lowered and finally transferred into it (loaded group of sausage links 34).

Packaging items 35 are supplied by a packaging transfer apparatus 32. Packaging transfer apparatus 32 likewise has a drive element 28, in a manner which is known per se. By intermittently operating packaging transfer apparatus 32, an empty packaging item 35 is positioned underneath transfer apparatus 6 and is subsequently filled with a group of sausage links 4. After that, another empty packaging item 35 is supplied, and the filled packaging item 34 is transported away.

The position of the second impeller 9 can be seen in FIG. 2. The group of sausage links 4 rests on respective vanes 41 of first impeller 8 and second impeller 9. The group of sausage links 4 is also guided laterally by another vane 41 of first impeller 8 and of second impeller 9. Finally, a height limiter 44 limits movement of the group of sausage links 4 in the direction opposite the direction of depositing. In the direction in which feeder belt 22 moves, the group of sausage links 4 is limited in its movement by stop member 38 (see FIG. 1). In addition, pusher dog 10 of triangular belt 12 (see FIG. 1) serves to limit movement of the group of sausage links 4 against the direction in which feeder belt 22 moves. The group of sausage links 4 is thus limited in its movement in every possible direction. By rotating impellers 8, 9 in opposite directions to each other, and in a coordinated manner with regard to the position of vanes 41, the groups of sausage links 4 can be transferred in a guided manner into packaging item 35. Finally, packaging transfer apparatus 32 also has a drive element 46 which allows the respective belt to be operated continuously and intermittently.

Figure 3:
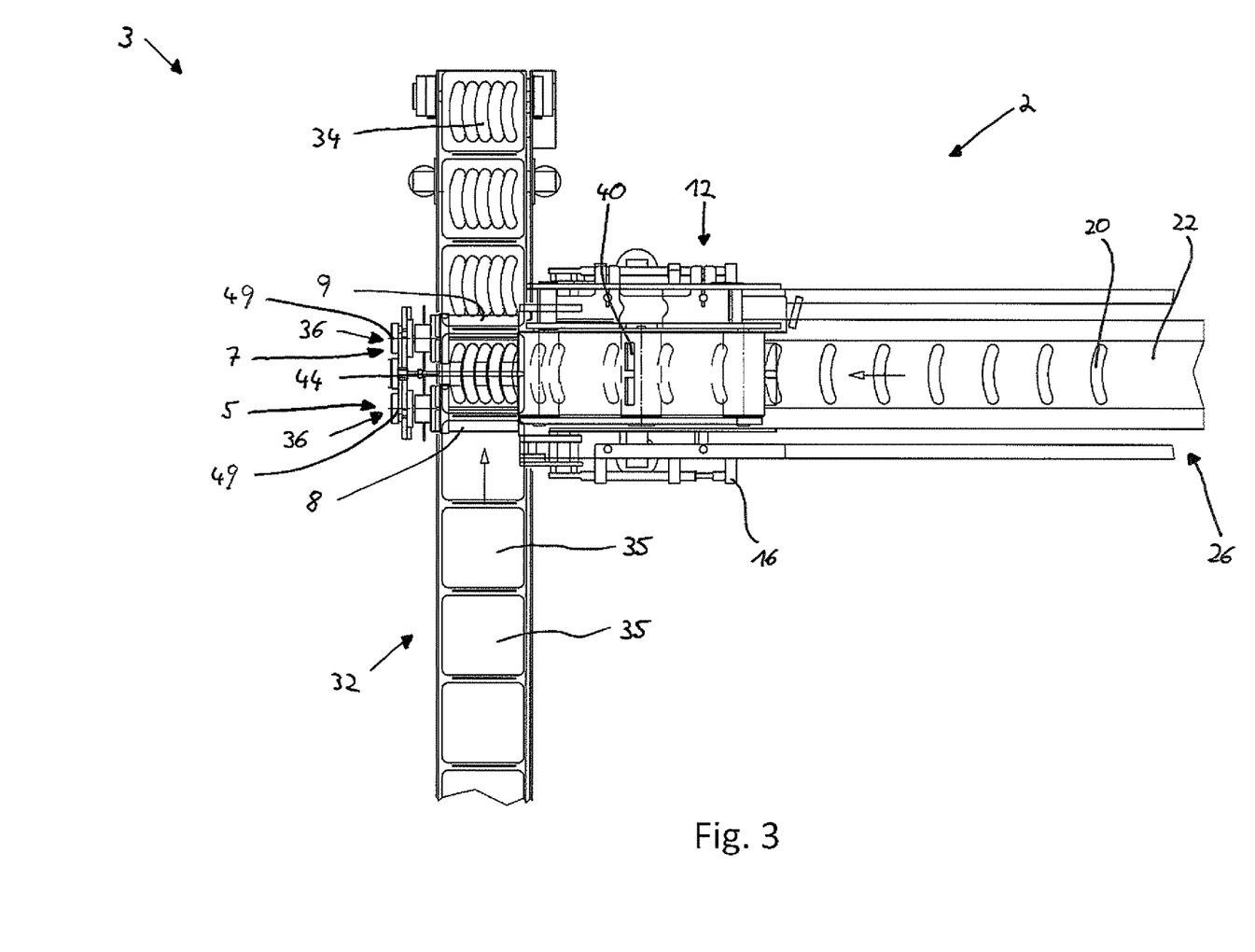
FIG. 3 shows a top view of the transfer apparatus of FIG. 1.

An analogous situation is shown in a top view in FIG. 3. In addition to the components already mentioned, drive units 36 of impellers 8, 9 are shown. In conjunction with a control unit (not shown), these enable impellers 8, 9 to be operated with the desired motion profiles. As already noted, different rotational angles, accelerations and different relationships between the positions of the first impeller 8 relative to the second impeller 9, as well as directions of rotation are possible. Impellers 8, 9 also have rotational axes 49 which may be spaced a variable distance apart.

Figure 4:
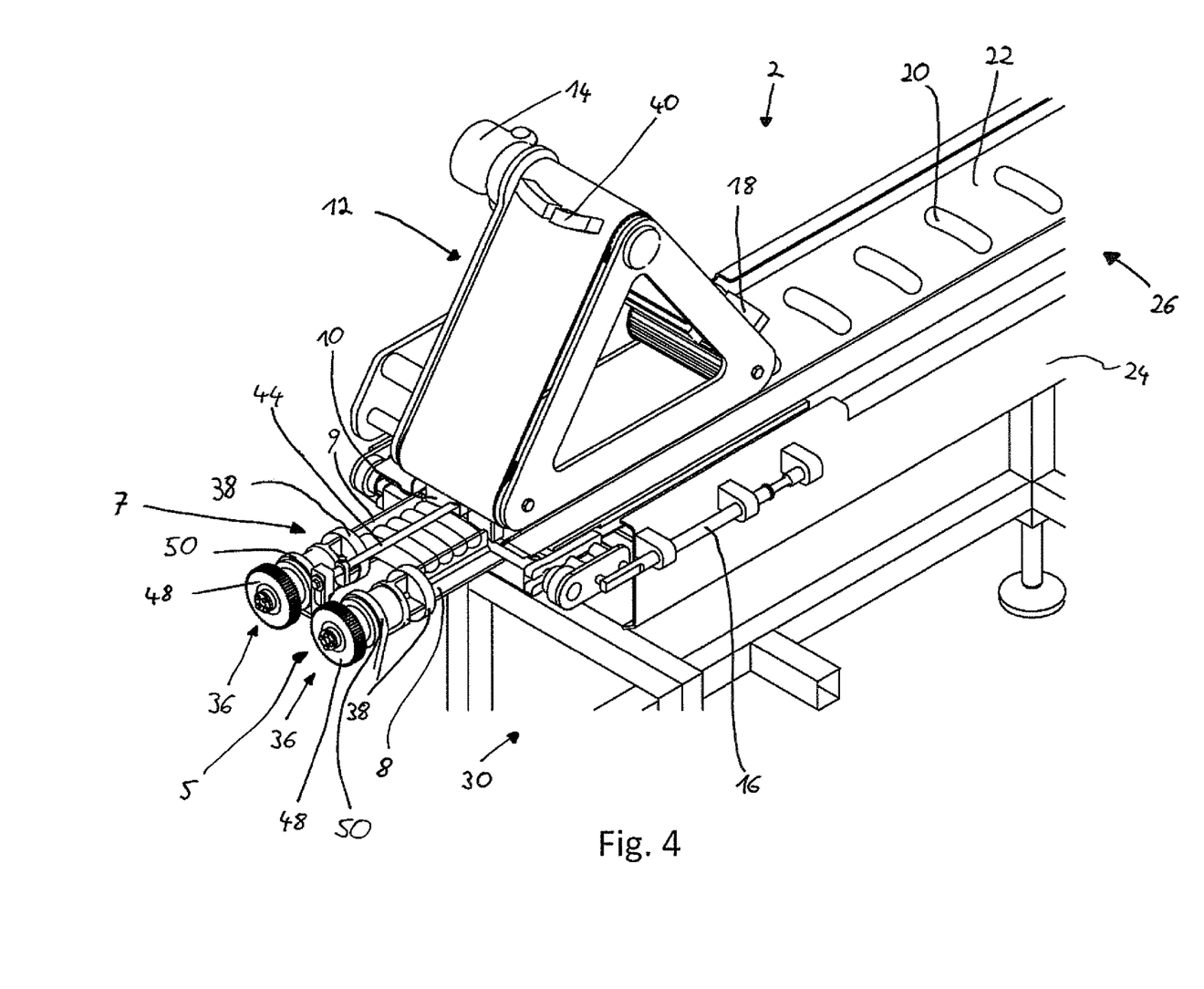
FIG. 4 shows a perspective view of the transfer apparatus of FIG. 1.

In the perspective view shown in FIG. 4, the packaging transfer apparatus 32 is not shown. What is shown, instead, is an embodiment of impeller drive units 36, in which kinetic energy is supplied via belt drives 50. In addition to that, however, it is also possible for a force to be supplied by wheels 48, for example.

Figure 5A:
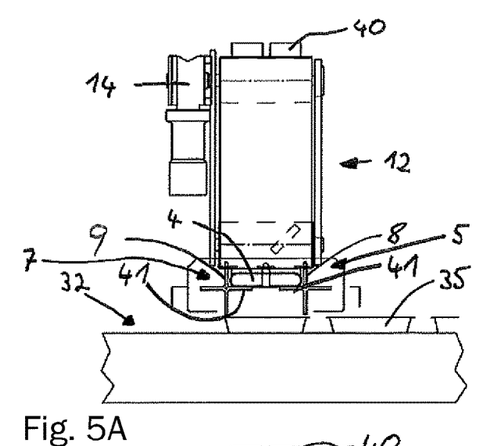
FIG. 5A shows the transfer apparatus of FIG. 1 operating a first step in the process of transferring a group of sausage links into a packaging item.
Figure 5B:
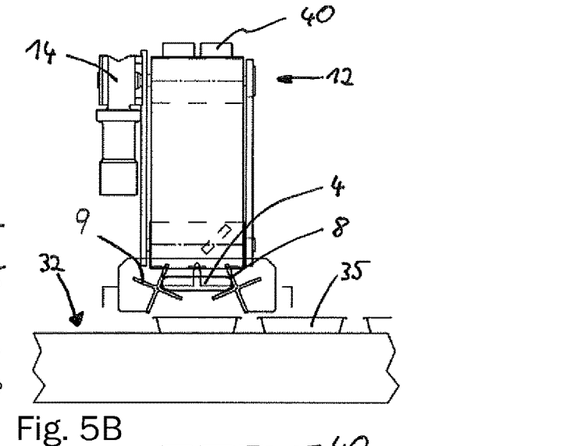
FIG. 5B shows the transfer apparatus of FIG. 5A operating another step in the process of transferring a group of sausage links into a packaging item.
Figure 5C:
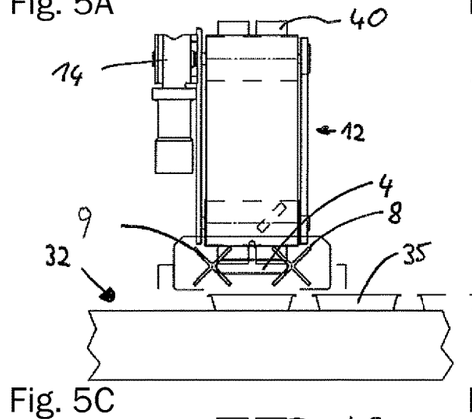
FIG. 5C shows the transfer apparatus of FIG. 5B operating another step in the process of transferring a group of sausage links into a packaging item.
Figure 5D:
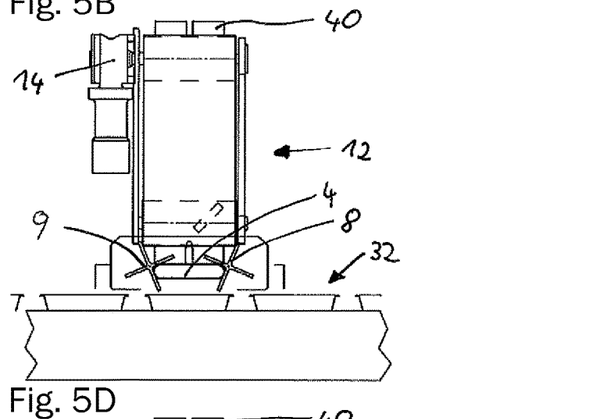
FIG. 5D shows the transfer apparatus of FIG. 5C operating another step in the process of transferring a group of sausage links into a packaging item.
Figure 5E:
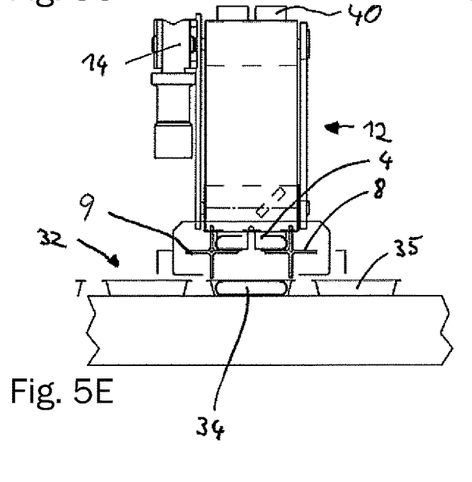
FIG. 5E shows the transfer apparatus of FIG. 5D operating another step in the process of transferring a group of sausage links into a packaging item.
Figure 5F:
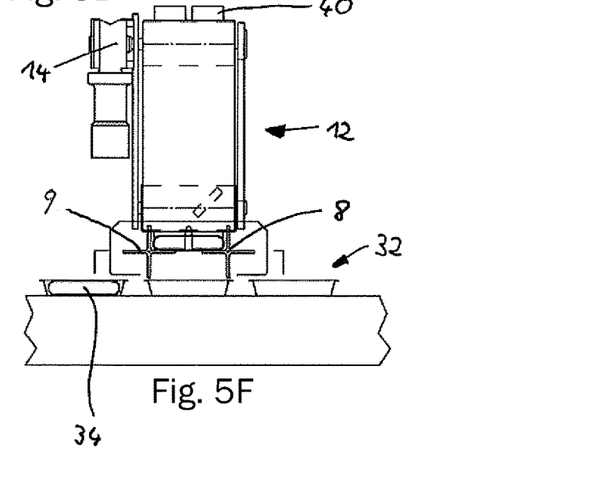
FIG. 5F shows the transfer apparatus of FIG. 5E operating another step in the process of transferring a group of sausage links into a packaging item.

FIGS. 5A through 5F show individual steps in the process of transferring a group of sausage links 4 into a packaging item 35, using this first embodiment of the apparatus 2. First, FIG. 5A shows a group of sausage links 4 being supplied. Vanes 41 of impellers 8, 9 are positioned horizontally. Each of the vanes extending perpendicularly to vanes 41 limits the group of sausage links 4 in the lateral direction. FIG. 5B shows impellers 8 and 9 after they have been rotated in opposite directions to each other. The group of sausage links 4 is now located in a kind of transport chamber and again is laterally bounded. In FIG. 5C, impellers 8 and 9 have now been rotated by approximately 45° relative to the starting position shown in FIG. 5A.

As can be seen, the group of sausage links 4 is once again in a transport chamber formed around it, and is guided and fixed in place by said chamber. The same applies in FIG. 5D, in which impellers 8, 9 have been rotated further in their respective opposite directions of rotation. The group of sausage links 4 is also contained and guided inside the receiving chamber. It is not until FIG. 5E that impellers 8, 9 have now been rotated 90° in opposite directions to each other, relative to the initial situation shown in FIG. 5A. The group of sausage links 4 is now released and falls into packaging item 35. During this process, the group of sausage links is again guided laterally. When the described position of impellers 8, 9 has been reached, a new group of sausage links 4 can be supplied simultaneously. The packaging transfer apparatus 32 is also driven in such a way that a new, unfilled packaging item 35 is positioned underneath transfer apparatus 6. The method then starts from the beginning again, with the step shown in FIG. 5A.

Figure 6A:
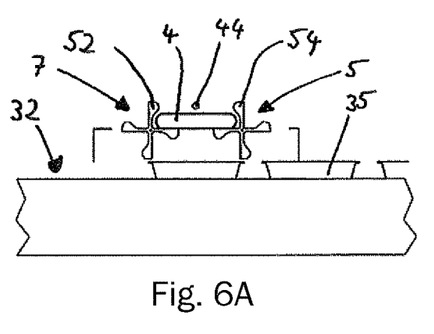
FIG. 6A shows another embodiment of the transfer apparatus according to the invention, in which the vanes have alternative contours, and operating a first step in the process of transferring a group of sausage links into a packaging item.
Figure 6B:
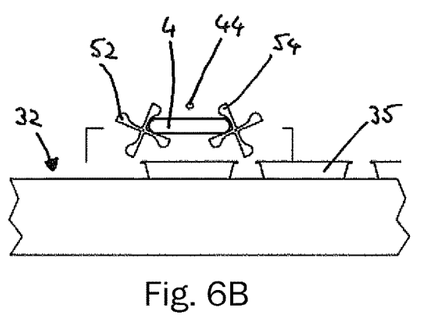
FIG. 6B shows the transfer apparatus of FIG. 6A operating another step in the process of transferring a group of sausage links into a packaging item.

FIGS. 6A through 6F show, in analogous form, the same steps as were discussed above with reference to FIGS. 5A through 5F, but using another embodiment of the apparatus of the present invention. For example, the impellers 52, 54 have an alternative design. In this alternative embodiment, impellers 52 and 54 have pusher dogs, or suitably adapted contours. These pusher dogs of impellers 52, 54 are substantially adapted, in part at least, to the shape of the goods to be transferred, and thus to the shape of the sausage links. In FIG. 6A, a group of sausage links 4 lands, in a manner known per se, on a respective vane 41 of the respective first and second impeller 52, 54. The respective support surface is planar. In FIG. 6B, first impeller 52 and second impeller 54 have now been rotated in opposite directions to each other by an angle of approximately 20° to 30°. As can be seen from FIG. 6B, the alternative embodiment of impellers 52, 54 provides the advantage of improved guidance of the group of sausage links 4.

Figure 6C:
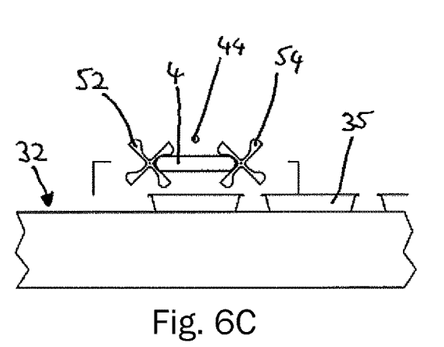
FIG. 6C shows the transfer apparatus of FIG. 6B operating another step in the process of transferring a group of sausage links into a packaging item.
Figure 6D:
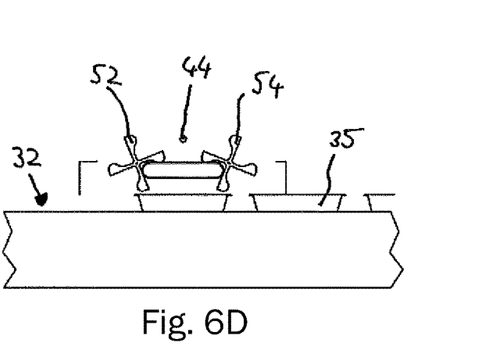
FIG. 6D shows the transfer apparatus of FIG. 6C operating another step in the process of transferring a group of sausage links into a packaging item.
Figure 6E:
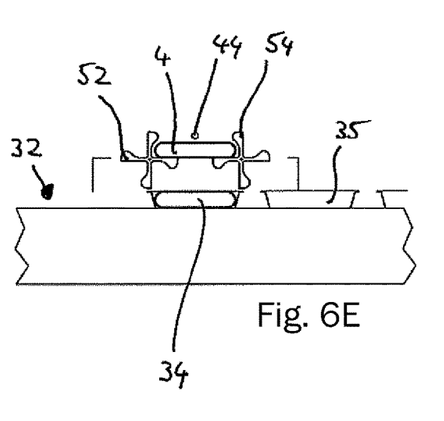
FIG. 6E shows the transfer apparatus of FIG. 6D operating another step in the process of transferring a group of sausage links into a packaging item.
Figure 6F:
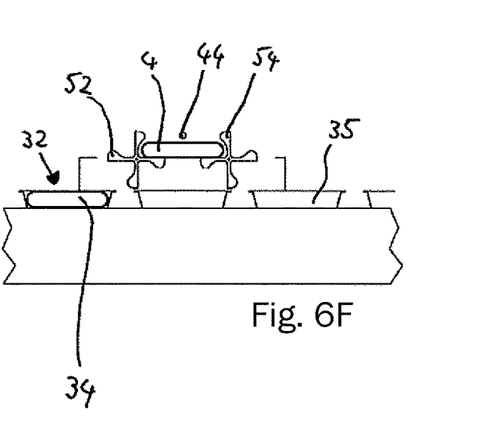
FIG. 6F shows the transfer apparatus of FIG. 6E operating another step in the process of transferring a group of sausage links into a packaging item.

Substantially greater accelerations in the direction of packaging items 35 can also be induced by such vane shapes. In FIG. 6C, in a manner already known from FIG. 5C, impellers 52 and 54 have now been rotated in opposite directions to each other and by approximately 45° relative to the initial position shown in FIG. 6A. The group of sausage links 4 is fixed in place by impellers 52, 54. The same applies to the step shown in FIG. 6D. It is not until step E of the method, in which impellers 52, 54 have been rotated in opposite directions by 90° relative to FIG. 6A, that the group of sausage links 4 is deposited into a tray, e.g., the packaging item 35. Simultaneously, and in known manner, a new group of sausage links 4 is supplied. After further transport of the group of sausage links group of sausage links 34 now placed in the packaging item, a new packaging item 35 can be positioned underneath the transfer apparatus, and the method starts from the beginning again with step 6A.

The contents described in the embodiments of the specification are merely used for particularizing the implementation forms of the present invention. The protection scope of the present invention should not be regarded as being merely limited to the specific forms stated in the embodiments, and the protection scope of the invention also includes equivalent technical means conceivable by those skilled in the art according to the conception of the present invention.

LIST OF REFERENCE SIGNS USED

2 Grouping and transfer apparatus
3 System for collating and loading sausage links into packaging items
4 Sausage links, collated, (group of sausage links)
5 First conveyor device
6 Transfer apparatus
7 Second conveyor device
8 First impeller
9 Second impeller
10 Pusher dog
12 Triangular belt
14 Drive unit of the triangular belt
16 Tensioning device
18 Pusher dog
20 Sausage link
22 Feeder belt
24 Cover
26 Feeder belt unit
28 Drive element
30 Basic frame
32 Packaging transfer apparatus
34 Group of sausage links placed in packaging item
35 Packaging item
36 Impeller drive element
38 Stop member
40 Pusher dog
41 Vane
44 Height limiter
46 Drive unit
48 Wheel
49 Axes of rotation
50 Belt drive
52 First impeller with pusher dog
54 Second impeller with pusher dog

What is claimed is:

1. An apparatus for transferring at least one sausage link into a packaging item, comprising:
   at least two drivable, rotatable conveyor devices each having at least two protruding vanes, the conveyor devices being adapted and configured in such a way that the at least one sausage link can be placed on one of the vanes in a receiving position and in such a way that by rotating the at least two conveyor devices, the at least one sausage link can be placed onto or into the packaging item by the vane in a delivery position,
   wherein the at least two conveyor devices are each designed as an impeller with the at least two vanes spaced substantially equally apart, and
   wherein the impellers are designed and dimensioned so that two opposite vanes of the impellers form in the receiving position a substantially horizontal support surface for a group of sausage links.

2. The apparatus of claim 1, wherein the conveyor devices are arranged spaced apart in relation to each other in such a way that the at least one sausage link can be placed simultaneously on two vanes of the spaced-apart conveyor devices, and that by synchronous rotation of the conveyor devices in opposite directions the at least one sausage link can be placed onto or into the packaging item by the vanes.

3. The apparatus of any claim 1, wherein each impeller has four vanes which substantially form a cross shape.

4. The apparatus of claim 1, wherein two spaced-apart impellers of the at least two conveyor devices, each having four vanes, are designed and can be rotated in opposite directions such that a group of parallel and adjacently arranged sausage links can be placed on two adjacent vanes of the spaced-apart impellers, while on each side of the group of sausage links a vane of the impellers forms a lateral boundary for the sausage links, and during rotation of the impellers in opposite directions a group of sausage links is laterally guided at two opposite ends of the sausage links by adjacent vanes of an impeller on their path of movement toward the packaging item, and on further rotation of the impellers the group of sausage links is released from the vanes of the adjacent impellers and can be placed into the packaging item.

5. The apparatus of claim 1, wherein a surface of the vanes is substantially planar.

6. The apparatus of claim 1, wherein a surface of the vanes is at least partially concavely and/or convexly curved, such that during motion between the vanes, the at least one sausage link is guided in a controlled manner.

7. The apparatus of claim 1, wherein the impellers are designed with four equally spaced-apart vanes which form receiving and conveying chambers for a sausage link or group of sausage links during rotation of the spaced-apart vanes in opposite directions.

8. The apparatus of claim 1, wherein the impellers have rotational axes arranged parallel to each other and spaced apart from each other in such a way that a distance between the rotational axes is greater than a length of the group of sausage links.

9. The apparatus of claim 1, further comprising:
an adjusting device by which a distance between the impellers can be varied in a range which corresponds substantially to a width of the group of sausage links.

10. The apparatus of claim 1, further comprising:
a feeder belt unit comprising a circulating conveyor element for feeding groups of sausage links in a feeding direction to the conveyor devices.

11. The apparatus of claim 1, further comprising:
a stop member which limits a feed path of the group of sausage links in a feeding direction and which guides the group of sausage links in the feeding direction until placement into the packaging item.

12. The apparatus of claim 11, wherein the stop member is adjustable in the feeding direction and against the feeding direction of the group of sausage links.

13. The apparatus of claim 12, wherein the stop member has a drive unit for moving the stop member.

14. The apparatus of claim 1, wherein the impellers consist of food-safe plastic.

15. The apparatus of claim 1, further comprising:
a coupling element having a receptacle for one of the impellers and configured to provide a detachable connection to the impeller.

16. The apparatus of claim 1, further comprising:
at least one electrical drive unit for driving the impellers, wherein the drive unit preferably has a linear motor or stepper motor for driving the at least one impeller.

17. The apparatus of claim 16, wherein the electrical drive unit has a controller for controlling stop positions, movements and accelerations of the impellers.

18. A method for transferring groups of sausage links into a packaging item, the method comprising:
loading a group of sausage links, arranged parallel and adjacent to each other, into a transfer apparatus having at least two spaced-apart impellers, such that the group of sausage links is located on two adjacent vanes of the impellers, the vanes guiding the group of sausage links laterally;
rotating the at least two impellers about respective rotational axes in opposite directions; and
releasing the group of sausage links into the packaging item.

19. The method of claim 18, further comprising:
collating sausage links into groups with a triangular belt.

20. A system for collating and loading sausage links into packaging items, the system comprising:
a feeder unit for feeding single sausage links transversely to a direction of transport onto a feeder belt unit, wherein the distance between the sausage links on the feeder belt unit is definable;
a feeder belt unit for guiding the sausage links from the feeder unit;
a triangular belt for collating sausage links and forming groups of sausage links; and
the apparatus of claim 1 for transferring the groups of sausage links into a packaging item.

* * * * *